(12) United States Patent
Nakano et al.

(10) Patent No.: US 7,892,694 B2
(45) Date of Patent: Feb. 22, 2011

(54) ELECTROLYTIC MEMBRANE, PROCESS FOR PRODUCING THE SAME, MEMBRANE ELECTRODE ASSEMBLY, FUEL CELL AND METHOD OF OPERATING THE SAME

(75) Inventors: Yoshihiko Nakano, Yokohama (JP);
Hideo Ohta, Minato-ku (JP); Kazuhiro Yasuda, Yokohama (JP); Jun Tamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1091 days.

(21) Appl. No.: 11/616,565

(22) Filed: Dec. 27, 2006

(65) Prior Publication Data

US 2007/0166590 A1    Jul. 19, 2007

(30) Foreign Application Priority Data

Dec. 28, 2005    (JP) .............................. 2005-378477

(51) Int. Cl.
*H01M 8/10*    (2006.01)
(52) U.S. Cl. ................. 429/491; 429/479; 429/483; 429/492; 429/493; 429/502; 429/310; 429/317
(58) Field of Classification Search ............ 429/491, 429/479, 483, 492, 493, 502, 310, 317
See application file for complete search history.

(56) References Cited

FOREIGN PATENT DOCUMENTS

| JP | 2001-504636 | 4/2001 |
|---|---|---|
| JP | 2005-5171 | 1/2005 |
| JP | 2005-113052 | 4/2005 |
| WO | WO 98/22989 | 5/1998 |

OTHER PUBLICATIONS

The abstract of the article of Kang et al. "Manufacture of an ion-exchange membrane for electrolysis and concentration of sea water";Choson Minjujuui Inmin Konghwaguk Kwahagwon Tongbo (1972), No. 3, pp. 38-42.*

* cited by examiner

*Primary Examiner*—Laura S Weiner
(74) *Attorney, Agent, or Firm*—Oblon, Spivak, McClelland, Maier & Neustadt, L.L.P.

(57) ABSTRACT

An electrolytic membrane comprising a porous membrane substrate containing a cross-linked polymer electrolyte having at least a structural component shown by following chemical formula 1:

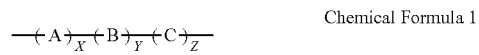

Chemical Formula 1 wherein A represents a repeating unit having an aromatic hydrocarbon group substituted by at least a sulfonic acid group, B represents a repeating unit having one of a nitrogen-containing hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group is 1 to 3.

17 Claims, 2 Drawing Sheets

ELECTROLYTIC MEMBRANE, PROCESS FOR PRODUCING THE SAME, MEMBRANE ELECTRODE ASSEMBLY, FUEL CELL AND METHOD OF OPERATING THE SAME

CROSS-REFERENCE TO RELATED APPLICATIONS

This application is based upon and claims the benefit of priority from the prior Japanese Patent Applications No. 2005-378477, filed on Dec. 28, 2005; the entire contents of which are incorporated herein by reference.

BACKGROUND OF THE INVENTION

1. Field of the Invention

The present invention relates to a technique of improving a proton conductive film of a fuel cell and, more precisely, to a proton conductive film comprising a porous substrate whose pores are filled with a polymer having a sulfonic acid group, a process for its production, a membrane electrode assembly and a fuel cell using it.

2. Background Art

In recent years, a fuel cell has been noted as a cell which imposes a less load on the environment and shows a high efficiency. In this fuel cell, a fuel such as hydrogen or methanol is electrochemically oxidized using oxygen to thereby provide energy as electric energy converted from chemical energy. As such fuel cell, various types have been developed, with a polymer electrolyte fuel cell using a proton exchange membrane as an electrolyte having been particularly noted.

FIG. 1 is a schematic diagram for illustrating the principle of the polymer electrolyte fuel cell.

In FIG. 1, numeral 1 designates a membrane electrode assembly which constitutes a main part of electricity-generating element. This membrane electrode assembly 1 comprises an electrolytic membrane 2 and a fuel electrode 3 (anode) and an oxidizer electrode 4 (cathode) joined on both surfaces of the membrane. A fuel path 5 is formed on the outer surface of the fuel electrode 3 so as to supply a fuel such as methanol. Also, an oxidizer path 6 is formed on the outer surface of the oxidizer electrode 4 so as to supply an oxidizer such as air.

The electrolytic membrane 2 constituting the membrane electrode assembly 1 is constituted by a proton conductive substance through which hydrogen ion can pass. In the fuel electrode 3, the fuel is oxidized by a catalyst contained in the fuel electrode 3 to generate electron, carbondioxide ($CO_2$) and hydrogen ion. This hydrogen ion reaches the opposite electrode of the oxidizer electrode 4 and combines with oxygen of the oxidizer electrode 4 to generate water. On the other hand, electron generated in the fuel electrode 3 is taken out of this fuel electrode 3 and the oxidizer electrode 4 so as to provide electric power to an outer load circuit 7.

In the above-described fuel cell, a proton conductive membrane having a fundamental structure of a fluorine-containing resin such as perfluorocarbon sulfonic acid represented by Nafion (trade name) has conventionally been used as the electrolytic membrane 2. This perfluorocarbon sulfonic acid membrane shows an excellent proton conductivity. This excellent proton conductivity is exhibited through the cluster network of a water containing state. Therefore, in a fuel cell using methanol, a problem is generated that methanol permeated from the fuel electrode 3 (anode) diffuses through the cluster network of the electrolytic membrane to the oxidizer electrode 4 (cathode) to lower the output voltage. When this methanol cross-over phenomenon takes place, the supplied liquid fuel directly reacts with the oxidizer, thus energy not being taken out as an electric power. Therefore, there arises a fatal problem that a stable output can not be obtained.

In order to solve this problem, it has been known to depress swelling by introducing a cross-linked structure into the electrolytic membrane to thereby suppress methanol cross-over. However, this method involves a problem that cross-linking of the entire membrane leads to a serious decrease of proton conductivity.

On the other hand, Nafion (trade name) shows excellent properties, but is expensive. In order to widely spread the fuel cell, a more inexpensive proton conductive film showing excellent properties has been required to obtain. As a means for such purpose, it has been known to use a sulfonated polymer material in place of Nafion (trade name) (see JP-A-2005-113052 (the term "JP-A" as used herein means an "unexamined published Japanese patent application")). This technique is to sulfonate a polymer material film by using a sulfonating agent.

However, this technique of reacting a hydrophobic polymer with a highly polar solvent of sulfuric acid requires a long reaction time, and the reaction difficultly proceeds uniformly on the entire surface of the film. When the reaction time is prolonged or the reaction temperature is raised in order to remove the problem of this non-uniform reaction, influence of oxidization with hot concentrated sulfuric acid becomes so serious that there arises a problem of deterioration of a resulting porous membrane or a polymerization polymer. Further, there arises a problem that a slight change in permeability of sulfuric acid, treating temperature and treating period would cause a serious change in sulfonation degree, leading to serious inhomogeneity of characteristic properties as electrolytic membrane.

The present invention has been made for solving the above-mentioned problems with the proton conductive film, and provides an electrolytic membrane for fuel cell at a low production cost which causes less cross-over of methanol, and a membrane electrode assembly and a fuel cell using the membrane.

SUMMARY OF THE INVENTION

The present invention has been made for solving the above-mentioned problems with the proton conductive film, and it is an object of the present invention to provide an electrolytic membrane for fuel cell at a low production cost which causes less cross-over of methanol, and a membrane electrode assembly and a fuel cell using the membrane.

The present invention has been made with the above circumstances in mind. In preparing a polymer of a cross-linked polymer electrolyte having a sulfonic acid group, it has been found that a highly uniform electrolytic membrane can be prepared by introducing a unit having a basic nitrogen-containing hetero ring into an electrolyte precursor polymer to thereby improve permeability of sulfuric acid into the electrolyte precursor polymer upon sulfonation reaction of the electrolyte precursor polymer with a sulfonating agent such as sulfuric acid and that introduction of this basic nitrogen-containing hetero ring structure serves to reduce cross-over of methanol in the prepared electrolytic membrane, thus the invention being completed based on the findings.

According to a first aspect of the present invention, an electrolytic membrane comprising a porous membrane substrate containing a cross-linked polymer electrolyte having at least a structural component shown by following chemical formula 1:

Chemical Formula 1

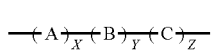

wherein A represents a repeating unit having an aromatic hydrocarbon group substituted by at least a sulfonic acid group, B represents a repeating unit having one of a nitrogen-containing hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3.

According to a second aspect of the present invention, a method for producing an electrolytic membrane, which comprises:

impregnating a porous membrane substrate with a monomer mixture solution containing a monomer represented by the following chemical formula 2, a monomer represented by the following chemical formula 3 and a cross-linking agent represented by the following chemical formula 4;

polymerizing the monomer mixture by heating the porous membrane substrate impregnated with the monomer mixture; and sulfonating the polymerization product obtained in the polymerizing of the monomer mixture by using a sulfonating agent:

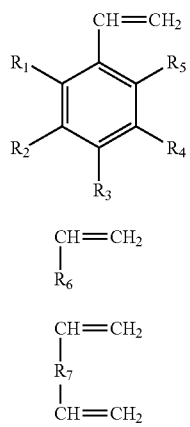

Chemical Formula 2

Chemical Formula 3

Chemical Formula 4

According to a third aspect of the present invention, A process for producing an electrolytic membrane, which comprises;

impregnating a porous membrane substrate with a monomer mixture solution containing a monomer represented by the following chemical formula 6, a monomer represented by the following chemical formula 3 and a cross-linking agent represented by the following chemical formula 4;

polymerizing the monomer mixture by heating the porous membrane substrate having been impregnated with the monomer mixture; and hydrolyzing the polymerization product obtained in the polymerizing of the monomer mixture:

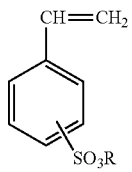

Chemical Formula 6

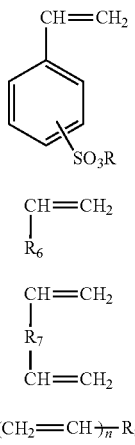

Chemical Formula 3

Chemical Formula 4

Chemical Formula 5

According to a fourth aspect of the present invention, a membrane electrode assembly comprising an electrolytic membrane having a fuel electrode joined onto one side thereof and an oxidizer electrode joined onto the other side thereof, the electrolytic membrane being prepared by filling a porous membrane substrate with a cross-linked polymer electrolyte having at least a structure component represented by the following chemical formula 1:

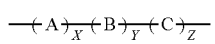

Chemical Formula 1 wherein A represents a repeating unit having an aromatic hydrocarbon group substituted by at least a sulfonic acid group, B represents a repeating unit having one of a nitrogen-containing hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3.

According to a fifth aspect of the present invention, A fuel cell comprising a membrane electrode assembly comprising an electrolytic membrane having a fuel electrode joined onto one side thereof and an oxidizer electrode joined onto the other side thereof, the electrolytic membrane being prepared by filling a porous membrane substrate with a cross-linked polymer electrolyte having at least a structure component represented by the following chemical formula 1:

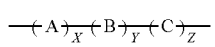

Chemical Formula 1 wherein A represents a repeating unit having an aromatic hydrocarbon group substituted by at least a sulfonic acid group, B represents a repeating unit having one of a nitrogen-containing hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3.

According to a sixth aspect of the present invention, a method of operating a fuel cell, which comprises: using the fuel cell of claim 18; and using a fuel containing methanol.

The invention permits to provide an electrolytic membrane causing less methanol cross-over and improve performance of a direct methanol type fuel cell (DMFC). Also, since the membrane can be prepared with ease from a general-purpose polymer, an electrolytic membrane can be provided at a low production cost. These advantages give a large impact on commercialization of the direct methanol type fuel cell.

BRIEF DESCRIPTION OF THE DRAWINGS

The invention disclosed herein will be understood better with reference to the following drawings of which.

DETAILED DESCRIPTION OF THE INVENTION

Figure 1:
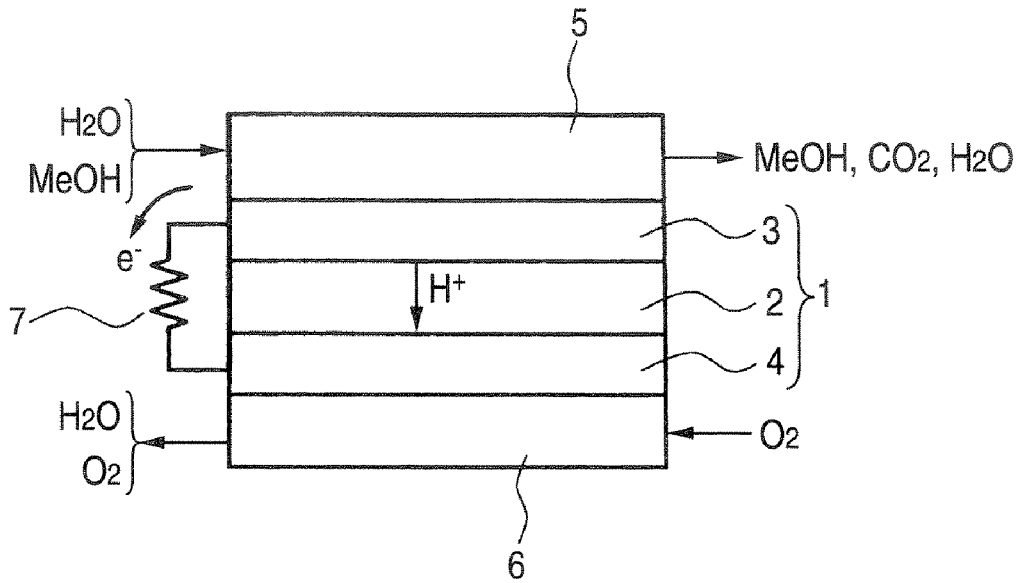
FIG. 1 is a schematic diagram of a fuel cell to be used in the invention.

Embodiments of the invention will be described one by one in the order of the electrolytic membrane, the process for its production, the membrane electrode assembly and the fuel cell using it.

First Embodiment

Electrolytic Membrane

An electrolytic membrane comprising a porous membrane substrate filled with a cross-linked polymer electrolyte having at least a structural component shown by the following chemical formula 1:

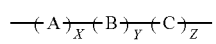

Chemical Formula 1 wherein A represents a repeating structural unit having an aromatic hydrocarbon group substituted by at least a sulfonic acid group, B represents a repeating structural unit having a nitrogen-containing hetero ring compound residue or the sulfate, hydrochloride or organic sulfonate thereof, C represents a repeating structural unit having a divalent hydrocarbon group, and X, Y and Z represent mol fractions of respective repeating structural units in the chemical formula 1, with $0.34 \leq X \leq 0.985$, $0.005 \leq Y \leq 0.49$, $0.01 \leq Z \leq 0.495$ and $Y \leq X$ and $Z \leq X$.

The cross-linked polymer electrolyte is specifically represented by the following chemical formula 7:

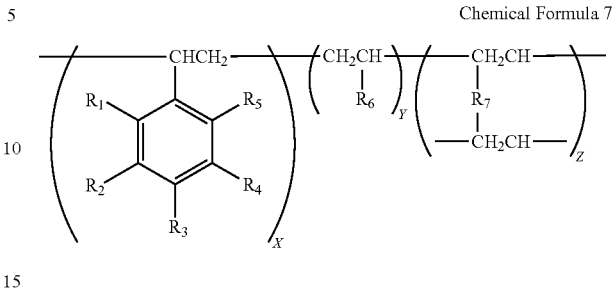

Chemical Formula 7 wherein X, Y and Z are the same as defined above, at least one of $R_1$, $R_2$, $R_3$, $R_4$ and $R_5$ represents a sulfonic acid group ($SO_3H$), and the rest of the substituents represent a group selected from among a hydrogen atom, a halogen element, an alkoxy group, a substituted or unsubstituted aliphatic hydrocarbon group and a substituted or unsubstituted aliphatic hydrocarbon group, $R_6$ represents a nitrogen atom-containing, substituted or unsubstituted hetero ring aromatic group or the sulfate, hydrochloride or organic sulfonate thereof, and $R_7$ represents a multivalent organic group.

The cross-linked polymer electrolyte represented by the above chemical formula 7 is obtained by polymerizing a vinyl group-having aromatic compound monomer, a vinyl group-having, nitrogen-containing heteroaromatic compound monomer and a divinyl compound linking agent having two or more vinyl groups. In this embodiment, other monomers which are different from the above-mentioned monomer components and which do not spoil proton conductivity may be copolymerized.

The vinyl group-having aromatic compound monomer represented by the chemical formula 2 to be used in this embodiment is a compound having a vinyl group connected to the aromatic ring directly or indirectly. To be specific, there can be illustrated styrene, 4-methoxystyrene, 4-chlorostyrene, 4-chloromethylstyrene, 4-vinylbiphenylene, 1-vinylnaphthalene, 2-vinylnaphthalene, 9-vinylanthracene, acenaphthylene and indene which, however, are not limitative at all. These compounds can be used independently or as a mixture thereof.

Also, the vinyl group-having, nitrogen-containing hetero ring compound monomer of the chemical formula 3 is a compound having a vinyl group connected to the nitrogen-containing hetero ring directly or indirectly and, specifically, there can be illustrated 2-vinylpyridine, 4-vinylpyridine, vinylcarbazole, 1-vinylimidazole, vinylquinoline, vinylpyrrole, vinylpyrazole, vinylpyrimidine, vinylpurine, vinylpyrazine and vinylisoquinoline which, however, are not limitative at all. These compounds can be used independently or as a mixture thereof.

As the monomer of the chemical formula 4 to be used as a cross-linking agent in this embodiment, there can be illustrated divinylbenzene, trivinylbenzene, bisvinylphenylethane, bisvinylphenoxyethane, 1,4-bisvinylphenoxybutane and 1,6-bisvinylphenoxyhexane which, however, are not limitative at all. Also, with divinylbenzene, there can be illustrated meta-isomer, para-isomer and the mixture thereof. Some commercially available divinylbenzene products contain styrene derivatives as impurities, but they may be polymerized at the same time without being removed.

In this electrolytic membrane, the introduced repeating unit having the basic nitrogen-containing hetero ring structure is considered to form sulfate in the basic nitrogen-containing hetero ring structure moiety as shown by the following chemical formula 8. That is, the basic substituent moiety such as a pyridinyl group in the polymer is forming a salt with sulfuric acid. This salt moiety can exchange the anion portion when treated with a highly concentrated acid. In the invention, a sulfonate is formed in this basic substituent moiety in the sulfonating step. Proton conductivity is reduced in this portion, resulting in an increase of resistance. This is disadvantageous in view of a fuel cell. However, introduction of the basic group serves to suppress permeation of methanol through the electrolytic membrane and, eventually, methanol permeability and proton conductivity can be controlled by the sulfonic acid group and the nitrogen-containing hetero ring structure moiety of the basic group. Thus, it becomes possible to design an electrolytic membrane adapted for a particular purpose.

Chemical Formula 8

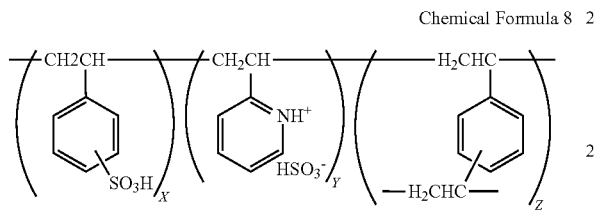

Regarding the monomer composition ratio of these monomers, mol fraction of the vinyl group-having aromatic compound monomer (X), mol fraction of the vinyl group-having, nitrogen-containing hetero ring compound monomer (Y) and mol fraction of the cross-linking agent (Z) are preferably in the ranges of: $34 \leq X \leq 0.985$, $0.005 \leq Y \leq 0.49$, $0.01 \leq Z \leq 0.495$ and $Y \leq X$ and $Z \leq X$.

X is preferably in the range of from 0.34 to 0.985, more preferably from 0.6 to 0.9. X is limited to this range because, when X is less than 0.34, there results a reduced proton conductivity whereas, when X is more than 0.985, there results a small effect by the vinyl group-containing, nitrogen-containing hetero ring compound monomer and the cross-linking agent, leading to failure of forming a uniform and stable membrane. Also, Y is preferably in the range of from 0.005 to 0.49, more preferably from 0.02 to 0.3. When Y is less than 0.005, it becomes difficult to accelerate permeation of sulfuric acid into the polymer membrane whereas, when Y is more than 0.49, there results a reduced proton conductivity of the electrolytic membrane, thus such ranges not being preferred. Z is in the range of from 0.01 to 0.495, preferably from 0.03 to 0.25. When Z is less than 0.01, there results such a small cross-linking effect that the cross-linked polymer membrane might be dissolved whereas, when more than 0.495, there results a reduced proton conductivity due to a large cross-linking degree, thus such ranges not being preferred.

In the above-described electrolytic membrane, the weight of the cross-linked electrolyte in the electrolytic membrane is preferably from 20 to 90% by weight (wt %), and the content of the structural component shown by the chemical formula 1 in the cross-linked electrolyte is preferably 50 wt % or more. It is not preferred for the weight of the cross-linked electrolyte to lower 20 wt %, because there might result a small proton conductivity whereas, it is not preferred for the weight of the cross-linked electrolyte to exceed 90 wt %, because there might result a weak membrane. It is not preferred for the content of the structural component shown by the chemical formula 1 in the cross-linked electrolyte to lower 50 wt %, because there might result a small proton conductivity.

As the porous membrane substrate to be used in this embodiment of the invention, there are illustrated a porous sheet of a high molecular substance having continuous pores, non-woven fabric and paper.

Materials of this porous membrane are required to be stable in the sulfonating step or the hydrolyzing step described hereinafter and stable upon operation of the fuel cell and, as long as these requirements are satisfied, the materials are not particularly limited. Specifically, the materials may be polyethylene, polypropylene, polyvinyl chloride, polyvinyl alcohol, polyvinylidene chloride, polyacrylonitrile, polyvinyl acetate, polyamide, polyester, polyimide, polyvinylpyrrolidone, polytetrafluoroethylene, polytrifluoroethylene, polyvinylidene fluoride and the copolymers thereof, with polyethylene being particularly preferred.

The porosity, average pore size and pore size distribution of the porous membrane to be used for preparing the electrolytic membrane can properly be selected. Usually, the porosity is from 20 to 80%, average pore size if from 0.01 to 10 µm, preferably from 0.05 to 2 µm. When the pore size is too small, it becomes difficult to fill the pores with the monomers whereas, when the pore size is too large, there results a weak reinforcing effect on the high molecular electrolyte. When the porosity is too small, there results a large resistance as an electrolytic membrane whereas, when too large, there results a weak strength of the porous membrane itself, leading to a reduced reinforcing effect. Further, it is preferred that the pore size distribution be uniform. The membrane thickness is from 1 to 100 µm, preferably from 10 to 40 µm. When the thickness is too small, there results an insufficient effect of reinforcing strength of the membrane and an insufficient effect of imparting flexibility and durability, and cross-over tends to occur. Also, when the membrane thickness is too large, there results a too high electric resistance. As such porous membrane material, those materials can be used which are generally commercially available as separators for lithium cells.

In using the cross-linked polymer electrolytic membrane of the invention in a fuel cell, the thickness of the cross-linked high molecular electrolytic membrane is not particularly limited, but is usually from 3 to 200 µm, preferably from 4 to 100 µm, more preferably from 5 to 50 µm. When the membrane is too thin, it fails to provide enough membrane strength to be practically usable whereas, when too thick, there results a high electric resistance, thus not being preferred as a separator film for a fuel cell. The membrane thickness can be controlled by properly selecting the thickness of the porous membrane, concentration of a solution for forming the cross-linked high molecular electrolyte or the coating thickness of the solution for forming the cross-linked high molecular electrolyte on the porous membrane.

The cross-linked polymer electrolyte to be provided by the invention is a polymer electrolytic membrane which is improved by the porous membrane with respect to defects of a high molecular electrolyte, mainly physical defects such as insufficient strength and flexibility and poor durability, and is suitable as an electrolytic membrane for a fuel cell.

Second Embodiment

Production Process 1

A process for producing the electrolytic membrane which is the first embodiment of the invention will be described in detail below.

The production process of this embodiment includes a step of impregnating a porous membrane substrate with a monomer composition comprising the vinyl group-having, nitrogen-containing hetero ring compound of the foregoing chemical formula 3, the vinyl group-containing aromatic compound monomer of the chemical formula 2, the cross-linking agent of the organic compound monomer having two or more vinyl groups of the chemical formula 4, and a radical initiator or a monomer solution prepared by adding a suitable amount of a solvent to the monomer composition (impregnating step), a step of polymerizing this monomer composition (polymerizing step) and a step of sulfonating the composite membrane obtained in the preceding step to thereby produce an electrolytic membrane having a sulfon group (sulfonating step). This process can provide an electrolytic membrane filled with an electrolyte containing at least the structure of the foregoing chemical formula 7.

(Impregnating Step)

This step is a step of impregnating the porous substrate with the monomer composition with the monomer composition comprising the vinyl group-having, nitrogen-containing hetero ring compound, the vinyl group-having aromatic compound monomer, the cross-linking agent of the organic compound monomer having two or more vinyl groups and a radical initiator. The aforesaid monomer composition solution is to be prepared by adding a suitable amount of a solvent when the monomers and the like are solid or when the viscosity of the monomer composition is too high, on order to smoothly conduct impregnation of the porous membrane with the composition.

As such solvent, any solvent can be selected to use that can uniformly dissolve the monomer composition. Specific examples thereof include toluene, xylene, THF and DMF which, however, are not limitative at all.

Next, as the radical initiator, any compound that can generate a radical upon being heated, such as an azo compound, a peroxide and the derivatives thereof which are used for polymerization of a vinyl monomer can be used. Specific examples thereof include AIBN and benzoyl peroxide which, however, are not limitative at all.

As a method of impregnating the porous substrate with the monomer composition, a method of coating or spraying the monomer composition or the solvent solution thereof onto the porous membrane substrate or a method of dipping the porous membrane into them may be employed. Additionally, in this step, the porous substrate may be placed on a support to conduct impregnation. As such support, metal, glass, plastic film such as polyethylene terephthalate (PET) film or PVA film, or film having provided thereon a membrane with a high barrier property such as SiOx can appropriately be used which, however, are not limitative at all.

Next, after impregnating the porous membrane with the monomer composition or the solution thereof, a protective film is closely applied to an opposite side of the porous substrate to the side in contact with the support so that no foams are formed therebetween to thereby prevent evaporation of the monomers or the like during the production step. The protective film may be the same as or different from the support. Specifically, metal, glass, plastic film such as polyethylene terephthalate (PET) film or PVA film, or film having provided thereon a membrane with a high barrier property such as SiOx can appropriately be used which, however, are not limitative at all.

(Polymerization Step)

After impregnating the porous membrane with the monomer composition in the preceding step, the monomers are copolymerized by heating using a press or the like. The temperature for radical polymerization may be from 80 to 150° C., preferably from 90 to 120° C. When the temperature is lower than the range, the curing period will become longer, leading to reduction in productivity. On the other hand, when the temperature is higher than the range, the polymer material used for the porous membrane will be softened or molten.

(Sulfonating Step)

The support and the protective film are removed from the composite obtained in the preceding step by copolymerizing the monomers and, subsequently, the polymerized membrane is sulfonated using a sulfonating agent.

As the sulfonating agent, known sulfonating agents such as concentrated sulfuric acid, fuming sulfuric acid, sulfur trioxide, sulfur trioxide-triethyl phosphate, chlorosulfonic acid and trimethylsilyl chlorosulfate can be used. Of these, concentrated sulfuric acid is preferred for the reason that other sulfonating agents have a too strong oxidizing ability or require the use of a halogen-containing organic solvent which imposes a large load on the environment.

The sulfonating temperature is from 60 to 130° C., preferably from 90 to 120° C. When the temperature is too low, the reaction time will be extremely prolonged whereas, when the temperature is too high, there results deterioration of the polymer. The sulfonating time is from 1 to 180 minutes, preferably from 2 minutes to 90 minutes. When the reaction time is too short, there results non-uniform sulfonation degree whereas, when too long, deterioration of the electrolytic membrane occurs.

When the sulfonated membrane from the hot concentrated sulfuric acid tank is directly washed with pure water after the sulfonation, a large heat is generated due to dilution with water, leading to a rapid rise in temperature on the surface of the membrane, thus the membrane being denatured. Thus, in order to prevent the film from being denatured by heat of dilution, sulfuric acid on the surface of the sulfonated membrane from the hot sulfuric acid tank is removed as much as possible, and then the membrane is dipped in a sulfuric acid tank of about 6M to 20M sulfuric acid, followed by washing with ion-exchanged water. Thus, heat generation by dilution can be reduced by stepwise lowering the concentration of sulfuric acid on the surface of the membrane. Such washing of the membrane with water is repeatedly conducted till pH of the washing solution becomes neutral, thus the electrolytic membrane being completed.

Third Embodiment

Production Process 2

In the second embodiment, a production process of sulfonating after polymerization of the monomers including the nitrogen-containing hetero ring compound for obtaining the polymer of the chemical formula 7 is shown. Alternatively, it is also possible to conduct polymerization using a monomer having a sulfonic ester group, and then hydrolyze the sulfonic ester group of the resulting polymer to convert it to a polymer having a sulfonic acid group in the side chain. Such production process will be described below.

This production process includes at least a step of impregnating a porous membrane substrate with a monomer mixture containing a monomer represented by the following chemical formula 6, a monomer represented by the following chemical formula 3 and a monomer represented by the following chemical formula 4 (impregnating step), a step of polymerizing the monomer mixture by heating the porous substrate impregnated with the monomer mixture (polymerizing step) and a step of hydrolyzing the polymerization product obtained in the preceding step to thereby generate a sulfonic acid group (hydrolyzing step).

In this embodiment, the monomer represented by chemical formula 3 and the monomer represented by chemical formula 4 may be the same as the compounds used in the foregoing second embodiment.

Specific examples of the compound represented by chemical formula 6 include ethyl o-, m- or p-styrenesulfonate, butyl styrenesulfonate, ethyl 4-methoxystyrenesulfonate, ethyl 4-chlorostyrenesulfonate, ethyl 4-chloromethylstyrenesulfonate, ethyl 4-vinylbiphenylenesulfonate, ethyl 1-vinylnaphthalenesulfonate, ethyl 2-vinylnaphthalenesulfonate, ethyl 9-vinylanthracenesulfonate, styrenesulfonic acid anhydride, styrenesulfonamide and styrenesulfonphenylamide.

Of these, ethyl styrenesulfonate is preferred because of its small molecular weight, state of being in a liquid form, and good solubility in various organic solvents.

(Impregnating Step and Polymerizing Step)

These steps can be conducted in the same manner as in the aforesaid second embodiment except that the monomer composition to be used is different. Hence, detailed descriptions are omitted.

(Hydrolyzing Step)

In this step, hydrolysis can be conducted by dipping a composite membrane containing the polymer in a hydrolyzing agent such as an aqueous solution of alkali such as tetramethylammonium hydroxide, choline or sodium hydroxide. The concentration of this aqueous solution is preferably from 1 to 10 wt %. When the concentration is lower than this range, the hydrolysis will require a prolonged period. On the other hand, when the concentration is higher than the range, the polymer itself will be denatured, thus not being preferred. The temperature for the hydrolysis is preferably from room temperature to 100° C. When the temperature is lower than the range, the hydrolysis reaction will not proceed. On the other hand, when the temperature is higher than the range, water of the solution will boil to inhibit the reaction. This hydrolyzing step can be completed in about 1 to about 5 hours. In addition, surfactant agent may be added to promote a hydrolisys.

In the case where the sulfonic acid group forms a salt with a cation (metal ion or primary, secondary, tertiary or quaternary ammonium) after the hydrolysis, it is necessary to replace the cation by proton. As a means to replace by proton, the electrolyte composite membrane can be impregnated with a sulfuric acid aqueous solution.

The thus-obtained electrolytic composite membrane is repeatedly washed with pure water till the washing solution becomes neutral to obtain an electrolytic membrane.

The cross-linked polymer electrolyte produced according to the above-mentioned process has an excellent ability of preventing the cross-over phenomenon of methanol and enables one to prepare a fuel cell showing an excellent electricity-generating efficiency.

Fourth Embodiment

Membrane-electrode Assembly

The membrane-electrode assembly of this embodiment can have the structure designated by numeral 1 in the foregoing FIG. 1. That is, in FIG. 1, it is a structure wherein a fuel electrode 3 is disposed on one surface of the electrolytic membrane 2 having been described in the first to third embodiments, and an oxidizer electrode 4 is disposed on the other surface of the electrolytic membrane 1.

The fuel electrode 3 can be prepared by supporting on an electrode support a composition containing a methanol-oxidizing catalyst as an effective component and further containing a proton conductive material, a water repellent and a binder. As the methanol-oxidizing catalyst, known RuPt, PtRuMo, PtRuW, PtIr or PtRuSn may be used.

Also, the oxidizer electrode 4 can be prepared by supporting on an electrode support a composition containing an oxygen-reducing catalyst as an effective component and further containing a proton conductive material, a water repellent and a binder. As the oxygen-reducing catalyst, known Pt, PtCo, PtNi, Fe, RuSe or RuSeS may be used.

These catalysts are preferably used in a granular form since it permits to exhibit the catalytic function with a high efficiency. As the proton conductive material, those materials which are used for the electrolytic membrane can be used. Also, the water repellent is compounded in order to prevent water from passing through the electrode membrane, and a fluorine-containing resin can be used as the water repellent. Further, the binder is used for binding the catalyst particles to each other to maintain the membrane form, and a high molecular resin can be used as the binder. Additionally, it is preferred to use a fluorine-containing resin as both the water repellent and the binder since the resin also exerts the function of water repellent. Further, in order to improve electrical conductivity of the fuel electrode 3, an electrically conductive agent can be added. As such conductive agent, carbon particles such as carbon black are preferably used. These additives are known in the art of direct methanol fuel cell.

As the electrode support, use of porous carbon paper is preferred since it can effectively transport a raw gas to the catalyst. In addition to it, there are illustrated thin film, mesh and sponge of gold, platinum, stainless steel or nickel and known conductive particles represented by titanium oxide, silica and tin oxide. The electrode may be formed by further joining a current collector to the electrode support, or the electrode support may also function as a current collector of the fuel electrode or the oxidizer electrode.

As to a method of supporting the catalyst on the electrode support, specifically, a suspension containing the above-mentioned methanol-oxidizing catalyst or the oxygen-reducing catalyst is coated on a desired electrode support such as porous carbon paper, followed by drying to obtain the catalyst-supporting support.

In addition to the above-mentioned coating method, the catalyst can be supported by a vacuum thin film-forming method represented by a sputtering method or a chemical paper deposition method or a chemical or electrochemical method such as a plating method, a non-electrode plating method or an impregnating method. Further, such methods as an arc melting method or a mechanical milling method can also be employed.

The fuel electrode 3 and the oxidizer electrode 4 are disposed on contact with the electrolytic membrane 2. As a method of disposing the fuel electrode 3 in contact with the electrolytic membrane 2, known methods including a hot press method and a cast filming method can be employed.

Fifth Embodiment

Fuel Cell (Active Type)

Figure 2:
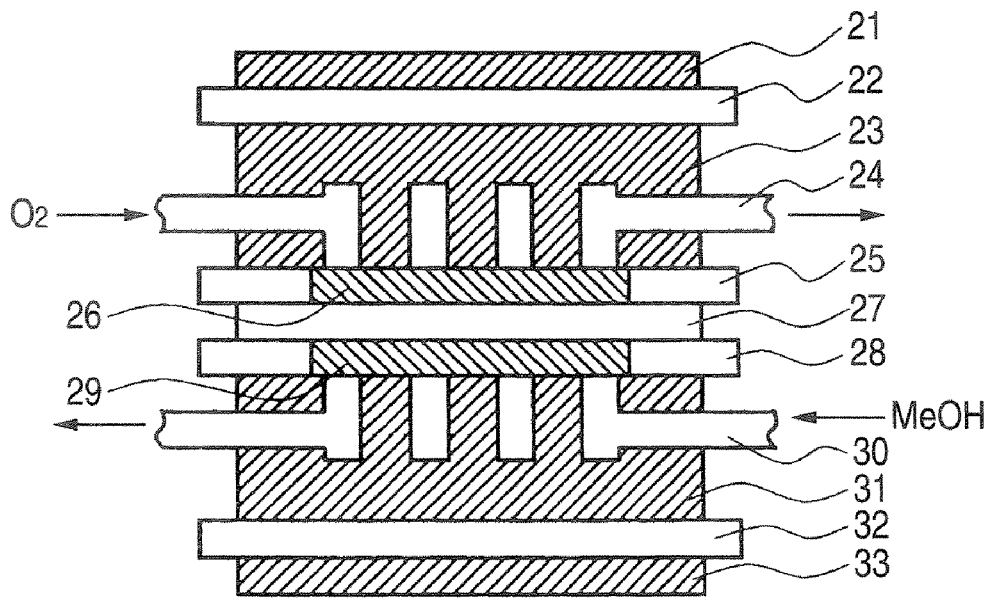
FIG. 2 is a schematic diagram of an active type fuel cell of the fourth embodiment.

Next, an active type fuel cell which is one embodiment of the fuel cell of the invention will be described below by reference to FIG. 2 showing its cross section. In the fuel cell of this embodiment, the high molecular electrolytic membrane having been prepared in the foregoing various embodiments is used.

FIG. 2 is a schematic diagram showing a unit cell of the active type fuel cell.

In FIG. 2, an electrolytic membrane 27 is disposed as an electrode-membrane assembly (MEA) wherein an oxidizer electrode (cathode) 26 and a fuel electrode (anode) 29 are in contact with respective surfaces of the electrolytic membrane 27. As this MEA, that which is prepared according to the methods described in the foregoing embodiments can be used. The oxidizer electrode 26 and the fuel electrode 29 are sealed at the ends with sealing members 25 and 28 such as PTFE so as to prevent leakage of a fuel and an exhaust gas. An oxidizer path 24 is formed in a form imbedded in an oxidizer path plate 23 on the outside of the oxidizer electrode 26 so as to supply an oxidizer such as air to the oxidizer electrode 26. Likewise, a fuel path 30 is formed in a form imbedded in a fuel path plate 31 on the outside of the fuel electrode 29 so as to supply a fuel such as methanol to the fuel electrode 29. The oxidizer and the fuel may be supplied or discharged through the oxidizer path 24 and the fuel path 30 forcibly by such means as a pump or non-forcibly by natural convection current.

The oxidizer path plate 23 and the fuel path plate 31 are preferably formed by an electrically conductive material in order to take out electric energy generated in the oxidizer electrode 26 and the fuel electrode 29. Current collectors 22 and 32 such as metal plates are disposed on the outside of the oxidizer path plate 23 and the fuel path plate 31, respectively, to take out electric energy.

Also, heaters 21 and 33 may be disposed on the outer side of the current collectors 22 and 32 to heat the fuel cell. This serves to improve electricity-generating efficiency of the fuel cell.

In the schematic diagram of the direct methanol type fuel cell shown in FIG. 2, no housing is shown. However, the above-mentioned assembly can be retained in a housing to constitute a fuel cell.

Also, in this embodiment, while FIG. 2 shows a unit cell of a unit assembly as an electricity-generating element, this unit cell may be used as such or a plurality of the cells may be connected in series and/or in parallel to constitute an onboard fuel cell. As methods of connecting cells, the conventional method of using a bipolar plate or a plane-connecting method may be employed. Needless to say, other known connecting methods are also useful.

Sixth Embodiment

Fuel Cell (Passive Type)

Figure 3:
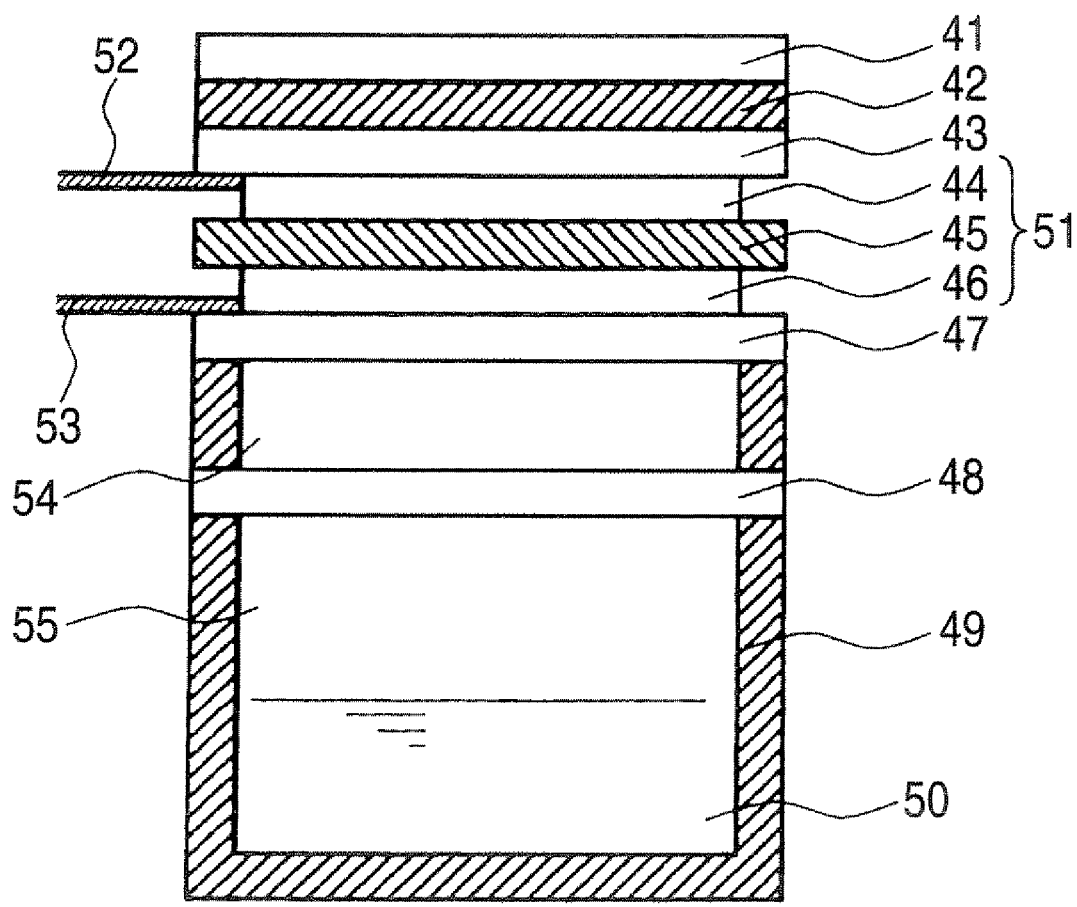
FIG. 3 is a schematic diagram of a passive type fuel cell of the fifth embodiment.

Next, a passive type fuel cell which is one embodiment of the fuel cell of the invention will be described below by reference to FIG. 3 showing its cross section. In the fuel cell of this embodiment, the high molecular electrolytic membrane having been prepared in the foregoing various embodiments is used.

FIG. 3 is a schematic diagram showing a unit cell of the passive type fuel cell.

In FIG. 3, an electrolytic membrane 45 is disposed as an electrode-membrane assembly (MEA) wherein an oxidizer electrode (cathode) 44 and a fuel electrode (anode) 46 are in contact with respective surfaces of the electrolytic membrane 45. As this MEA, that which is prepared according to the methods described in the foregoing embodiments can be used. Lead wires 52 and 53 are connected to the oxidizer electrode 44 and the fuel electrode 46 so as to take out electric energy. A fuel tank 49 containing a fuel 50 such as methanol is disposed under the fuel electrode 46. The fuel contained in the fuel tank 49 evaporates and passes through an evaporation membrane 48, an evaporation chamber 54 and a perforated fastening plate 47 to reach the fuel electrode 46. In the passive type fuel cell of this embodiment, the fuel is supplied by natural convection current without any forcibly gas-charging means.

On the other hand, a perforated fastening plate 43, a porous water-retaining plate 42 and a perforated fastening plate 41 are disposed above the oxidizer electrode 44 so as to supply oxygen to the oxidizer electrode 44.

In the schematic diagram of the passive type fuel cell shown in FIG. 3, no housing is shown. However, the above-mentioned assembly can be retained in a housing to constitute a fuel cell.

Also, in this embodiment, while FIG. 3 shows a unit cell of a unit assembly as an electricity-generating element, this unit cell may be used as such or a plurality of the cells may be connected in series and/or in parallel to constitute an onboard fuel cell. As methods of connecting cells, known methods such as a plane-connecting method may be employed.

EXAMPLES

Examples of the invention will be described in detail below. Additionally, the invention is not limited only to the following Examples and can be properly altered and changed within the gist of the invention.

Example 1

0.834 g (8.0 mmol) of styrene and 0.106 g (1.0 mmol) of 2-vinylpyridine were mixed with 0.204 g (1.0 mmol) of a cross-linking agent (65% divinylbenzene (manufactured by Aldrich Co.) and 11 mg of benzoyl peroxide (BPO) to prepare a monomer composition. A 6 cm×7.5 cm polyethylene porous membrane (manufactured by Asahi Kasei Corp.; Separator N720 (25μ thick)) placed on a support (SiOx-vacuum deposited PVA film) was impregnated with the monomer composition, and a protective film (the same as the support) was closely applied thereto, followed by polymerizing for 20 minutes while applying pressure by means of a press heated to 110° C. After delaminating the protective film and the support, the synthesized membrane was reacted for 10 minutes in concentrated sulfuric acid at a temperature of 105° C., and then dipped in an about 18 N sulfuric acid solution, followed by washing with pure water till the washing solution became neutral to prepare an electrolytic membrane. Conditions of Example 1 are shown in Tables 1 and 2.

Examples 2 to 29

Electrolytic membranes were prepared in the same manner as in Example 1 using the monomer compositions and porous membranes described in Tables 1 and 2.

TABLES 1 AND 2

| | Vinylaromatic compound monomer | | Vinyl group-substituted, nitrogen-containing hetero ring compound | | | Cross-linking agent | | | Radical polymerixa-tion initiator |
|---|---|---|---|---|---|---|---|---|---|
| | Weight (g) | X | Kind | Weight (g) | Y | Kind | Weight (g) | Z | Benzoyl peroxide Weight (g) |
| Example 1 | 1.672 | 0.8 | 2-vinyl-pyridine | 0.210 | 0.1 | divinyl-benzene | 0.401 | 0.1 | 0.023 |
| Example 2 | 1.756 | 0.84 | 2-vinyl-pyridine | 0.231 | 0.11 | divinyl-benzene | 0.200 | 0.05 | 0.022 |
| Example 3 | 1.714 | 0.82 | 2-vinyl-pyridine | 0.210 | 0.1 | divinyl-benzene | 0.320 | 0.08 | 0.022 |
| Example 4 | 1.777 | 0.85 | 2-vinyl-pyridine | 0.105 | 0.05 | divinyl-benzene | 0.401 | 0.1 | 0.023 |
| Example 5 | 1.463 | 0.7 | 2-vinyl-pyridine | 0.421 | 0.2 | divinyl-benzene | 0.401 | 0.1 | 0.023 |
| Example 6 | 1.868 | 0.894 | 2-vinyl-pyridine | 0.111 | 0.053 | divinyl-benzene | 0.212 | 0.053 | 0.022 |
| Example 7 | 0.951 | 0.455 | 2-vinyl-pyridine | 0.189 | 0.09 | divinyl-benzene | 1.823 | 0.455 | 0.030 |
| Example 8 | 0.711 | 0.34 | 2-vinyl-pyridine | 0.694 | 0.33 | divinyl-benzene | 1.322 | 0.33 | 0.027 |
| Example 9 | 1.045 | 0.5 | 2-vinyl-pyridine | 0.526 | 0.25 | divinyl-benzene | 1.001 | 0.25 | 0.026 |
| Example 10 | 1.035 | 0.495 | 2-vinyl-pyridine | 0.021 | 0.01 | divinyl-benzene | 1.983 | 0.495 | 0.030 |
| Example 11 | 2.048 | 0.98 | 2-vinyl-pyridine | 0.021 | 0.01 | divinyl-benzene | 0.040 | 0.01 | 0.021 |
| Example 12 | 1.965 | 0.94 | 2-vinyl-pyridine | 0.063 | 0.03 | divinyl-benzene | 0.120 | 0.03 | 0.021 |
| Example 13 | 1.359 | 0.65 | 2-vinyl-pyridine | 0.105 | 0.05 | divinyl-benzene | 1.202 | 0.3 | 0.027 |
| Example 14 | 1.547 | 0.74 | 2-vinyl-pyridine | 0.025 | 0.012 | divinyl-benzene | 0.961 | 0.24 | 0.025 |
| Example 15 | 1.538 | 0.736 | 2-vinyl-pyridine | 0.444 | 0.211 | divinyl-benzene | 0.212 | 0.053 | 0.022 |
| Example 16 | 1.463 | 0.7 | 2-vinyl-pyridine | 0.315 | 0.15 | divinyl-benzene | 0.601 | 0.15 | 0.024 |
| Example 17 | 1.254 | 0.6 | 2-vinyl-pyridine | 0.631 | 0.3 | divinyl-benzene | 0.401 | 0.1 | 0.023 |
| Example 18 | 1.651 | 0.79 | 2-vinyl-pyridine | 0.021 | 0.01 | divinyl-benzene | 0.801 | 0.2 | 0.025 |
| Example 19 | 1.672 | 0.8 | 2-vinyl-pyridine | 0.210 | 0.1 | Bisvinyl-phenyl-ethane | 0.469 | 0.1 | 0.024 |
| Example 20 | 1.672 | 0.8 | 4-vinyl-pyridine | 0.210 | 0.1 | divinyl-benzene | 0.401 | 0.1 | 0.023 |
| Example 21 | 1.463 | 0.7 | 4-vinyl-pyridine | 0.421 | 0.2 | divinyl-benzene | 0.401 | 0.1 | 0.023 |
| Example 22 | 1.672 | 0.8 | N-vinyl-imidazole | 0.188 | 0.1 | divinyl-benzene | 0.401 | 0.1 | 0.023 |
| Example 23 | 1.568 | 0.75 | N-vinyl-imidazole | 0.013 | 0.007 | divinyl-benzene | 0.973 | 0.243 | 0.026 |
| Example 24 | 1.777 | 0.85 | N-vinyl-imidazole | 0.094 | 0.05 | divinyl-benzene | 0.401 | 0.1 | 0.023 |
| Example 25 | 1.463 | 0.7 | N-vinyl-imidazole | 0.376 | 0.2 | Bisvinyl-phenyl-ethane | 0.469 | 0.1 | 0.023 |
| Example 26 | 1.777 | 0.85 | N-vinyl-carbazole | 0.194 | 0.05 | divin-yl-benzene | 0.401 | 0.1 | 0.024 |
| Example 27 | 1.672 | 0.8 | N-vinyl-carbazole | 0.387 | 0.1 | divin-yl-benzene | 0.401 | 0.1 | 0.025 |
| Example 28 | 1.463 | 0.7 | N-vinyl-carbazole | 0.774 | 0.2 | divin-yl-benzene | 0.401 | 0.1 | 0.026 |
| Example 29 | 1.538 | 0.736 | N-vinyl-carbazole | 0.817 | 0.211 | bisvin-yl phen-ylethane | 0.248 | 0.053 | 0.026 |

Examples 30 to 36

Electrolytic membranes were prepared in the same manner as in Example 1 under the conditions shown in Table 3 using 2-vinylpyridine as the vinyl group-having, nitrogen-containing hetero ring compound, divinylbenzene as the cross-linking agent, substances shown in Table 3 as the vinyl group-having aromatic compound monomers.

TABLE 3

| | Vinyl group-having aromatic compound | | | Vinyl group-having, nitrogen-containing hetero ring compound/2-vinylpyridine | | Cross-linking agent/divinyl-benzene | | Radical polymerization initiator/benzoyl peroxide | Solvent/toluene |
|---|---|---|---|---|---|---|---|---|---|
| | Kind | Weight (g) | X | Weight (g) | Y | Weight (g) | Z | Weight (g) | Weight (g) |
| Example 30 | p-methyl-styrene | 2.009 | 0.85 | 0.118 | 0.05 | 0.401 | 0.1 | 0.025 | 0.000 |
| Example 31 | p-chloro-methylstyrene | 2.595 | 0.85 | 0.118 | 0.05 | 0.401 | 0.1 | 0.031 | 0.000 |
| Example 32 | p-methoxy-styrene | 2.281 | 0.85 | 0.118 | 0.05 | 0.401 | 0.1 | 0.028 | 0.000 |
| Example 33 | 1-vinyl-naphthalene | 2.621 | 0.85 | 0.118 | 0.05 | 0.401 | 0.1 | 0.031 | 0.000 |
| Example 34 | 2-vinyl-naphthalene | 2.621 | 0.85 | 0.118 | 0.05 | 0.401 | 0.1 | 0.031 | 1.031 |
| Example 35 | 9-vinyl-anthracene | 3.473 | 0.85 | 0.118 | 0.05 | 0.401 | 0.1 | 0.040 | 1.324 |
| Example 38 | 4-vinyl-biphenyl | 2.657 | 0.85 | 0.118 | 0.05 | 0.401 | 0.1 | 0.032 | 1.076 |

Example 37

3.694 g (17.4 mmol) of ethyl styrenesulfonate and 0.047 g (0.4 mmol) of 2-vinylpyridine were mixed with 0.441 g (2.2 mmol) of a cross-linking agent (65% divinylbenzene (manufactured by Aldrich Co.) and 11 mg of benzoyl peroxide (BPO) to prepare a monomer composition. A 6 cm×7.5 cm polyethylene porous membrane (manufactured by Asahi Kasei Corp.; Separator N720 (25μ thick)) placed on a support (SiOx-vacuum deposited PVA film) was impregnated with the monomer composition, and a protective film (the same as the support) was closely applied thereto, followed by polymerizing for 20 minutes while applying pressure by means of a press heated to 110° C. After delaminating the protective film and the support, the polymerized membrane was hydrolyzed for 3.5 hours at 100° C. using an aqueous solution of tetramethylammonium hydroxide. After washing with pure water, the film was dipped in a sulfuric acid aqueous solution and heated at 100° C. for 2 hours on a hot plate in order to replace with proton, followed by cooling. Then, the film was washed with pure water till the washing water became neutral to thereby prepare an electrolytic membrane. This electrolytic membrane was stored in pure water before its evaluation was conducted. Detailed conditions of this Example are shown in Table 4.

TABLE 4

| | Porous membrane | | | Vinyl group-having aromatic compound/ethyl styrene-sulfonate | | Vinyl group-having, nitrogen-containing hetero ring compound/2-vinylpyridine | | Cross-linking agent/divinyl-benzene | | Radical polymerization initiator/benzoyl peroxide |
|---|---|---|---|---|---|---|---|---|---|---|
| | Film thick-ness (μm) | Manufacturer | Production No. | Weight (g) | X | Weight (g) | Y | Weight (g) | Z | Weight (g) |
| Example 37 | 22 | Asahi Kasei Corp. | N720 | 3.694 | 0.87 | 0.047 | 0.02 | 0.441 | 0.11 | 0.042 |
| Example 38 | 25 | Asahi Kasei Corp. | N720 | 3.778 | 0.89 | 0.047 | 0.02 | 0.361 | 0.09 | 0.042 |
| Example 39 | 25 | Asahi Kasei Corp. | N720 | 3.863 | 0.91 | 0.035 | 0.015 | 0.300 | 0.075 | 0.042 |
| Example 40 | 25 | Asahi Kasei Corp. | N720 | 3.906 | 0.92 | 0.033 | 0.014 | 0.264 | 0.066 | 0.042 |

TABLE 4-continued

| | Porous membrane | | | Vinyl group-having aromatic compound/ethyl styrene-sulfonate | | Vinyl group-having, nitrogen-containing hetero ring compound/2-vinylpyridine | | Cross-linking agent/divinyl-benzene | | Radical polymerization initiator/benzoyl peroxide |
|---|---|---|---|---|---|---|---|---|---|---|
| | Film thick-ness (μm) | Manufacturer | Production No. | Weight (g) | X | Weight (g) | Y | Weight (g) | Z | Weight (g) |
| Example 41 | 25 | Asahi Kasei Corp. | N720 | 3.948 | 0.93 | 0.028 | 0.012 | 0.232 | 0.058 | 0.042 |
| Example 42 | 25 | Asahi Kasei Corp. | N710 | 3.694 | 0.87 | 0.047 | 0.02 | 0.441 | 0.11 | 0.042 |
| Example 43 | 20 | Asahi Kasei Corp. | N9420G | 3.694 | 0.87 | 0.047 | 0.02 | 0.441 | 0.11 | 0.042 |
| Example 44 | 27 | Asahi Kasei Corp. | S6022 | 3.694 | 0.87 | 0.047 | 0.02 | 0.441 | 0.11 | 0.042 |
| Example 45 | 23.4 | Mitsui Chemicals | 2221 | 3.694 | 0.87 | 0.047 | 0.02 | 0.441 | 0.11 | 0.042 |
| Example 46 | 26 | Mitsui Chemicals | 2251 | 3.694 | 0.87 | 0.047 | 0.02 | 0.441 | 0.11 | 0.042 |
| Example 47 | 21 | Tonen | F20DMA | 3.694 | 0.87 | 0.047 | 0.02 | 0.441 | 0.11 | 0.042 |
| Example 48 | 20 | Tonen | E20MMS | 3.694 | 0.87 | 0.047 | 0.02 | 0.441 | 0.11 | 0.042 |
| Example 49 | 30 | Tonen | E30MMS | 3.694 | 0.87 | 0.047 | 0.02 | 0.441 | 0.11 | 0.042 |

Examples 38 to 49

Electrolytic membranes were prepared in the same manner as in Example 37 under the conditions shown in Table 4.

Examples 50 to 66

Electrolytic membranes were prepared in the same manner as in Example 1 under the conditions shown in Table 5 except for using styrene as the vinyl group-having aromatic compound monomer and divinylbenzene as the cross-linking agent.

TABLE 5

| | Porous membrane | | | | Vinyl group-having aromatic compound/styrene | |
|---|---|---|---|---|---|---|
| | Material | Membrane thick-ness (μm) | Manufacturer | Product No. | Weight (g) | X |
| Example 50 | PE | 9 | Tonen | E09HMS | 0.930 | 0.445 |
| Example 51 | PE | 9 | Toray Industries | NR209 | 0.711 | 0.34 |
| Example 52 | PE | 12 | Toray Industries | NR312 | 1.045 | 0.5 |
| Example 53 | PE | 12 | Tonen | F12BMS | 1.035 | 0.495 |
| Example 54 | PE | 16 | Tonen | E16MMS | 1.359 | 0.65 |
| Example 55 | PE | 16 | Toray Industries | NR416 | 1.672 | 0.8 |
| Example 56 | PE | 36 | Toray Industries | NA635 | 1.868 | 0.894 |
| Example 57 | PI | 35 | Ube Industries | | 1.868 | 0.894 |
| Example 58 | PAI | 35 | Daicel Chemical Industries | | 1.868 | 0.894 |
| Example 59 | PTFE | 32 | Sumitomo Electric Ind. | HP-010-30 | 1.868 | 0.894 |
| Example 60 | PTFE | 70 | Sumitomo Electric Ind. | FP-010-60 | 1.965 | 0.94 |
| Example 61 | PTFE | 40 | Sumitomo Electric Ind. | HP-045-30 | 1.868 | 0.894 |

TABLE 5-continued

| | | | | | | |
|---|---|---|---|---|---|---|
| Example 62 | PTFE | 70 | Sumitomo Electric Ind. | FP-500-100 | 1.965 | 0.94 |
| Example 63 | PTFE | 80 | Sumitomo Electric Ind. | FP-100-100 | 1.965 | 0.94 |
| Example 64 | PTFE | 65 | Sumitomo Electric Ind. | FP-022-60 | 1.965 | 0.94 |
| Example 65 | PTFE | 77 | Sumitomo Electric Ind. | FP-045-80 | 1.965 | 0.94 |
| Example 66 | PP/PE/PP | 25 | Ube Industries | | 1.868 | 0.894 |

| | Vinyl group-having, nitrogen-containing hetero ring compound | | | Cross-linking agent/divinylbenzene | | Radical polymerization initiator |
|---|---|---|---|---|---|---|
| | kind | Weight (g) | Y | Weight (g) | Z | Weight (g) |
| Example 50 | 2-vinylpyridine | 0.213 | 0.09 | 1.783 | 0.445 | 0.029 |
| Example 51 | 2-vinylpyridine | 0.780 | 0.33 | 1.322 | 0.33 | 0.028 |
| Example 52 | 2-vinylpyridine | 0.591 | 0.25 | 1.001 | 0.25 | 0.026 |
| Example 53 | 2-vinylpyridine | 0.024 | 0.01 | 1.983 | 0.495 | 0.030 |
| Example 54 | 2-vinylpyridine | 0.118 | 0.05 | 1.202 | 0.3 | 0.027 |
| Example 55 | 2-vinylpyridine | 0.236 | 0.1 | 0.401 | 0.1 | 0.023 |
| Example 56 | 2-vinylpyridine | 0.125 | 0.053 | 0.212 | 0.053 | 0.022 |
| Example 57 | 2-vinylpyridine | 0.125 | 0.053 | 0.212 | 0.053 | 0.022 |
| Example 58 | 2-vinylpyridine | 0.125 | 0.053 | 0.212 | 0.053 | 0.022 |
| Example 59 | 2-vinylpyridine | 0.125 | 0.053 | 0.212 | 0.053 | 0.022 |
| Example 60 | 2-vinylpyridine | 0.071 | 0.03 | 0.120 | 0.03 | 0.022 |
| Example 61 | 2-vinylpyridine | 0.125 | 0.053 | 0.212 | 0.053 | 0.022 |
| Example 62 | 2-vinylpyridine | 0.071 | 0.03 | 0.120 | 0.03 | 0.022 |
| Example 63 | 2-vinylpyridine | 0.071 | 0.03 | 0.120 | 0.03 | 0.022 |
| Example 64 | 2-vinylpyridine | 0.071 | 0.03 | 0.120 | 0.03 | 0.022 |
| Example 65 | 3-vinylpyridine | 0.071 | 0.03 | 0.120 | 0.03 | 0.022 |
| Example 66 | 4-vinylpyridine | 0.125 | 0.053 | 0.212 | 0.053 | 0.022 |

Comparative Example 1

A 6 cm×7.5 cm porous membrane (manufactured by Asahi Kasei Corp.; Separator N720 (26μ thick)) placed on a support of SiOx-vacuum deposited PVA film was impregnated with a mixture of 1.0 g of styrene, 0.2 g of a cross-linking agent (divinylbenzene) and 12 mg of a catalyst (BTO), and a protective film (the same as the support) was closely applied thereto, followed by polymerizing for 120 minutes while applying pressure by means of a press heated to 105° C. The thus-formed membrane was reacted for 120 minutes at 105° C. in concentrated sulfuric acid, and then dipped in an about 18M sulfuric acid aqueous solution, followed by washing with water to complete an electrolytic membrane. Details on Comparative Example are shown in Table 6.

TABLE 6

| | Vinyl group-having aromatic compound | | | Cross-linking agent | | | Radical polymerization initiator/ benzoyl peroxide |
|---|---|---|---|---|---|---|---|
| | kind | Weight (g) | X | Kind | Weight (g) | Z | Weight (g) |
| Comparative Example 1 | styrene | 1.986 | 0.95 | divinylbenzene | 0.200 | 0.05 | 0.020 |
| Comparative Example 2 | styrene | 1.986 | 0.95 | divinylbenzene | 0.200 | 0.05 | 0.020 |

Comparative Example 2

An electrolytic membrane was produced under the same conditions as in Comparative Example 1 except for changing the sulfonating conditions to 150° C. in reaction temperature and 10 minutes in reaction time.

Example 67

Membrane properties of the electrolytic membranes prepared in Examples and Comparative Examples were evaluated by measuring permeability of methanol and electric conductivity.

Measurement of Methanol Permeability

Two glass-made vessels kept at 25° C. were separated from each other by each electrolytic membrane, and pure water was placed in one of the vessels, and a 3M methanol aqueous solution in the other vessel. Methanol permeated to the pure water side with the elapse of time, resulting in an increase of methanol concentration. The methanol concentration was measured at 4-minute intervals according to gas chromatography, and the permeability was determined from the slope of an increase in concentration. As an evaluation standard, methanol permeability of a membrane of Nafion (trade name) 117 was measured. The methanol permeability of Nafion (trade name) 117 was 3.0 μmol/min/cm² as a found value.

The proton conductivity of each electrolytic membrane was determined as a value normalized with the characteristic value of Nafion (trade name) 117 and shown in Tables 7, 8 and 9.

TABLE 7

| Electrolytic Membrane Used | Proton Conductivity (A) | Methanol Permeability (B) | Membrane Performance Coefficient α = B/A |
|---|---|---|---|
| Example 1 | 1.17 | 0.527 | 0.450 |
| Example 2 | 2.07 | 0.804 | 0.388 |
| Example 3 | 1.6 | 0.771 | 0.482 |
| Example 4 | 1.42 | 0.558 | 0.393 |
| Example 5 | 1.06 | 0.543 | 0.512 |
| Example 6 | 2.2 | 0.964 | 0.438 |
| Example 7 | 0.8 | 0.32 | 0.400 |
| Example 8 | 0.7 | 0.252 | 0.360 |
| Example 9 | 0.73 | 0.28 | 0.384 |
| Example 10 | 0.77 | 0.33 | 0.429 |
| Example 11 | 6.2 | 2.05 | 0.331 |
| Example 12 | 4.28 | 2.62 | 0.612 |
| Example 13 | 0.87 | 0.39 | 0.448 |
| Example 14 | 1.25 | 0.55 | 0.440 |
| Example 15 | 1.24 | 0.692 | 0.558 |
| Example 16 | 1.12 | 0.535 | 0.478 |
| Example 17 | 0.89 | 0.422 | 0.474 |
| Example 18 | 1.54 | 0.78 | 0.506 |
| Example 19 | 0.95 | 0.41 | 0.432 |
| Example 20 | 1.1 | 0.502 | 0.456 |
| Example 21 | 0.98 | 0.491 | 0.501 |
| Example 22 | 1.21 | 0.512 | 0.423 |
| Example 23 | 1.31 | 0.723 | 0.552 |
| Example 24 | 1.35 | 0.621 | 0.460 |
| Example 25 | 1.02 | 0.451 | 0.442 |
| Example 26 | 1.33 | 0.579 | 0.435 |
| Example 27 | 1.04 | 0.513 | 0.493 |
| Example 28 | 0.95 | 0.485 | 0.511 |
| Example 29 | 1.21 | 0.54 | 0.446 |
| Example 30 | 1.39 | 0.542 | 0.390 |

TABLE 8

| Electrolytic Membrane Used | Proton Conductivity (A) | Methanol Permeability (B) | Membrane Performance Coefficient α = B/A |
|---|---|---|---|
| Example 31 | 1.25 | 0.524 | 0.419 |
| Example 32 | 1.53 | 0.613 | 0.401 |
| Example 33 | 2.36 | 1.06 | 0.449 |
| Example 34 | 2.4 | 1.05 | 0.438 |
| Example 35 | 1.95 | 0.85 | 0.436 |
| Example 36 | 2.52 | 1.12 | 0.444 |
| Example 37 | 3.63 | 1.7 | 0.468 |
| Example 38 | 3.97 | 1.81 | 0.456 |
| Example 39 | 4.45 | 2.07 | 0.465 |
| Example 40 | 5.24 | 2.15 | 0.410 |
| Example 41 | 5.51 | 2.21 | 0.401 |
| Example 42 | 4.25 | 1.93 | 0.454 |
| Example 43 | 4.88 | 1.9 | 0.389 |
| Example 44 | 4.48 | 1.88 | 0.420 |
| Example 45 | 5.13 | 2.4 | 0.468 |
| Example 46 | 4.71 | 2.2 | 0.467 |
| Example 47 | 4.82 | 1.8 | 0.373 |
| Example 48 | 4.15 | 1.84 | 0.443 |
| Example 49 | 2.89 | 1.34 | 0.464 |
| Example 50 | 2.61 | 1.06 | 0.406 |
| Example 51 | 2.2 | 0.89 | 0.405 |
| Example 52 | 1.31 | 0.521 | 0.398 |
| Example 53 | 1.25 | 0.495 | 0.396 |

TABLE 8-continued

| Electrolytic Membrane Used | Proton Conductivity (A) | Methanol Permeability (B) | Membrane Performance Coefficient α = B/A |
|---|---|---|---|
| Example 54 | 1.04 | 0.512 | 0.492 |
| Example 55 | 1.32 | 0.564 | 0.427 |
| Example 56 | 1.42 | 0.625 | 0.440 |
| Example 57 | 1.48 | 0.613 | 0.414 |
| Example 58 | 1.51 | 0.626 | 0.415 |
| Example 59 | 1.45 | 0.571 | 0.394 |
| Example 60 | 1.38 | 0.832 | 0.603 |

TABLE 9

| Electrolytic Membrane Used | Proton Conductivity (A) | Methanol Permeability (B) | Membrane Performance Coefficient α = B/A |
|---|---|---|---|
| Example 61 | 1.72 | 0.726 | 0.422 |
| Example 62 | 1.42 | 0.812 | 0.572 |
| Example 63 | 1.32 | 0.744 | 0.564 |
| Example 64 | 1.61 | 0.943 | 0.586 |
| Example 65 | 1.44 | 0.799 | 0.555 |
| Example 68 | 2.05 | 0.856 | 0.418 |
| nafion 117 | 1 | 1 | 1.000 |
| Comparative Example 1 | 1.14 | 0.73 | 0.640 |
| Comparative Example 2 | — | — | — |

Measurement of electric conductivity--Direct current measuring method

A conventional method of using an alternating current impedance apparatus sometimes gives an electric conductivity largely deviated from an actual cell properties. In addition, it gives extremely fluctuated results of measurement and suffers change with time after loading a sample, thus having involved problems with accuracy. Therefore, a direct current measuring method was employed in this experiment. This method is a method of sending proton as a direct current to the electrolytic membrane as upon generating electricity by DMFC and determining the proton conductivity from the resistance value.

Specifically, electrolysis of water is conducted by sending a constant current (0.1 A) in a sulfuric acid aqueous solution (1 mol/l) using platinum electrodes so as to allow generated $H^+$ to migrate between the electrodes. When an electrolytic membrane is inserted between the electrodes, $H^+$ migrates through the membrane to cause voltage drop. The resistance value can be determined by measuring the potential difference by means of a calomel electrode disposed on the surface of the membrane. Actually, measurement is conducted in the absence and presence of the membrane, and the resistance value is determined from the difference between the measured results. As a standard, Nafion (trade name) 117 was subjected to the measurement. The proton conductivity of each electrolytic membrane was normalized with respect to the characteristic value of Nafion (trade name) and shown in Table 7, 8 or 9.

As is shown in Tables 7, 8 and 9, both the proton conductivity and the methanol permeability underwent such serious changes depending upon the electrolytic membrane that relative evaluation on the membrane characteristics is difficult. Thus, in this Example, in order to clarify relative methanol permeability of the synthesized electrolytic membrane, methanol permeability (α) normalized through the proton conductivity was calculated to evaluate. The values are also shown in Tables 7, 8 and 9.

α=(methanol permeability normalized with Nafion (trade name) 117/(proton conductivity normalized with Nafion (trade name) 117

This α value stands for the methanol permeability per proton conductivity, with α of Nafion (trade name) 117 being 1. The smaller the α value, the more suppressed the methanol permeation. As is shown in Tables 7, 8 and 9, various synthesized membranes have an α value smaller than 0.7, thus it being found that the methanol permeability per proton conductivity of each of the synthesized membranes is more suppressed than that of Nafion (trade name) 117.

Example 68

Electrodes were prepared in the following manner using the electrolytic membranes prepared in the Examples.

Preparation of Anode Electrode (A-1)

55 mg of a CNF catalyst supporting about 42% of RuPt and carbon supporting about 42% of RuPt (Printex 25) were dispersed in water, and subjected to suction filtration on carbon paper (manufactured by Toray Industries; 120; 3×4 cm$^2$) having been treated with a 10% PTFE dispersion to impart water-repelling properties, thus a catalyst layer being formed. After drying, the carbon paper was impregnated with a 4% Nafion (trade name) solution for 2 minutes under reduced pressure, then with a 6% Nafion (trade name) solution for 3 minutes. Excess Nafion (trade name) solution was absorbed on a filter paper, followed by drying at room temperature to obtain an anode electrode (A-1). The catalyst amount was adjusted to be about 3.6 mg/cm$^2$ in terms of the amount of PtRu.

Preparation of Cathode Electrode (C-1)

2.0 g of carbon (KETJEN) supporting about 70% of Pt, 2.0 g of water, 8.0 g of methoxypropanol and 6.0 g of a 20% Nafion (trade name) solution were mixed in this order in a 50-ml plastic vessel with a lid retaining 50 g of 10φ zirconia balls and 25 g of 5φ zirconia balls, and were subjected to dispersing treatment for 6 hours in a desk ball mill to prepare a catalyst slurry.

Carbon paper (manufactured by Toray Industries; 090; 20×20 cm$^2$) was subjected to a treatment with a 20% PTFE dispersion to impart water-repelling properties and, further, MPL was formed thereon in an thickness of about 30 µm. The catalyst slurry was coated thereon using a flat coater (with a gap of about 400 µm) and dried one day and one night at room temperature. A 12-cm$^2$ piece was cut out of this carbon paper to prepare a cathode electrode (C-1) The cathode catalyst amount was adjusted to abut 2.0 mg/cm$^2$ in terms of the Pt amount.

Preparation of Anode Electrode (A-2)

2.0 g of carbon (printex 25) supporting about 43% of PtRu, 2.0 g of water, 8.0 g of methoxypropanol and 6.0 g of a 20% Nafion (trade name) solution were mixed in this order in a 50-ml plastic vessel with a lid retaining 50 g of 10φ zirconia balls and 25 g of 5φ zirconia balls, and were subjected to dispersing treatment for 6 hours in a desk ball mill to prepare a catalyst slurry.

Carbon paper (manufactured by Toray Industries; 120; 20×10 cm$^2$) was subjected to a treatment with a 10% PTFE dispersion to impart water-repelling properties. The catalyst slurry was coated thereon using a flat coater (with a gap of about 400 µm) and dried one day and one night at room temperature. A 12-cm$^2$ piece was cut out of this carbon paper to prepare an anode electrode (A-2). The anode catalyst amount was adjusted to abut 2.6 mg/cm$^2$ in terms of the PtRu amount.

50 mg of a CNF catalyst supporting Pt was dispersed in water, and subjected to suction filtration on carbon paper (manufactured by Toray Industries; 120; 3×4 cm$^2$) having been treated with a 20% PTFE dispersion to impart water-repelling properties, thus a catalyst layer being formed. After drying, the carbon paper was impregnated with a 4% Nafion (trade name) solution for 2 minutes under reduced pressure, then with a 6% Nafion (trade name) solution for 3 minutes. Excess Nafion (trade name) solution was absorbed on a filter paper, followed by drying at room temperature to obtain a cathode electrode (C-2). The catalyst amount was adjusted to be about 1.5 mg/cm$^2$ in terms of the amount of Pt.

Comparative Example 4

Preparation of Membrane-Electrode Assembly (MEA)

After subjecting the anode (A-1) and the cathode (C-1) prepared in Example 68 to boiling treatment in a hot sulfuric acid aqueous solution (water/concentrated sulfuric acid=2/1 by weight) for 1 hour, the electrodes were washed with boiling water to remove sulfuric acid. Then, the electrodes were washed with running water to use. The two electrodes and a protonated Nafion (trade name) 117 membrane were hot pressed under the hot pressing conditions of 125° C., 5 minutes and 30 kg/cm$^2$ to prepare MEA.

Examples 69 to 77

MEAs were prepared in the same manner as in Comparative Example 4 except for using the electrolytic membranes prepared in Examples shown in Table 10 in place of the Nafion (trade name) film.

TABLE 10

| MEA Used | Electrolytic Membrane Used | Voltage (V) (150 mA/cm2) | Maximum Output (mW/cm2) |
| --- | --- | --- | --- |
| Example 69 | Example 1 | 0.367 | 62 |
| Example 70 | Example 2 | 0.404 | 75.01 |
| Example 71 | Example 3 | 0.407 | 76.58 |
| Example 72 | Example 4 | 0.425 | 81.35 |
| Example 73 | Example 5 | 0.419 | 80.57 |
| Example 74 | Example 6 | 0.379 | 61.65 |
| Example 75 | Example 13 | 0.36 | 60 |
| Example 76 | Example 15 | 0.428 | 80.35 |
| Example 77 | Example 18 | 0.352 | 54.15 |
| Comparative Example 4 | nafion 117 | 0.284 | 43.67 |

Example 78

Each of the MEAs obtained according to the above-mentioned method was used to assemble active type DMFC shown in FIG. 2, and electricity generation was conducted using the assemblies to evaluate electricity-generating properties.

Electricity-generating properties of the various MEAs of Comparative Example 4 and Examples 69 to 77 were evaluated using the unit cell (see FIG. 2) of the active type DMFC fuel cell. As the fuel, a 3M methanol aqueous solution was used. Electricity generation was conducted under the conditions that the amount of supplied methanol solution was 0.8 ml/min and that the amount of supplied air was 120 ml/min, with the cell temperature being 70° C. The results are shown in Table 10 in terms of voltage (V) at a current density of 150 mA/cm².

Example 79

After evaluation in Example 78, long-term performance of each of MEAs obtained in Comparative Example 4 and Examples 71 to 79 was evaluated. The cells were operated for 500 hours (operating for 12 hours, stopping for 12 hours) under the operating conditions of 0.8 ml/min in the amount of supplied solution, 120 ml/min in the amount of supplied air, 70° C. in cell temperature and 150 mA/cm² in current density. The change in voltage was the same as that of MEA of Nafion (trade name) 117, and voltage drop was within 7% of the voltage in the initial stage.

Comparative Example 5

After subjecting the anode (A-2) and the cathode (C-2) prepared in Example 68 to boiling treatment in a hot sulfuric acid aqueous solution (water/concentrated sulfuric acid=2/1 by weight) for 1 hour, the electrodes were washed with boiling water to remove sulfuric acid. Then, the electrodes were washed with running water to use. The two electrodes and a protonated Nafion (trade name) 117 membrane were hot pressed under the hot pressing conditions of 125° C., 5 minutes and 30 kg/cm² to prepare MEA.

Examples 80 to 84

Membrane-electrode assemblies (MEA) were prepared in the same manner as in Comparative Example 5 except for using the electrolytic membranes prepared in Examples shown in Table 11 in place of Nafion (trade name) membrane.

Example 85

Passive type DMFCs were assembled using the MEAs used in the above-described method, and electricity generation was conducted to evaluate the electricity-generating properties thereof.

That is, electricity-generating properties of the various MEAs of Comparative Example 5 and Examples 80 to 84 were evaluated using pure methanol as a fuel and using a standard cell of the passive type DMFC as shown in FIG. 3. The standard cell was constituted as shown in FIG. 3. Pure methanol was vaporized to supply to the anode, whereas air was supplied to the cathode by utilizing a spontaneously generating convection current.

The maximum electricity-generating densities thus obtained are shown in Table 11.

TABLE 11

| MEA Used | Maximum Output (mW/cm2) |
|---|---|
| Example 80 | 14.5 |
| Example 81 | 16.52 |
| Example 82 | 14.3 |
| Example 83 | 16.21 |
| Example 84 | 14.85 |
| Comparative Example 5 | 8.1 |

As is apparent from the results shown in Table 11, while the fuel cell using MEA of Comparative Example 5 provided the maximum output of 8.1 mW/cm², all of the fuel cells of Examples provided the maximum output more than 14 mW/cm², thus showing extremely excellent electricity-generating efficiency.

What is claimed is:

1. An electrolytic membrane comprising a porous membrane substrate comprising a cross-linked polymer electrolyte comprising a structural component represented by the following chemical formula 1:

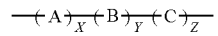

Chemical Formula 1 wherein A represents a repeating unit having an aromatic hydrocarbon group substituted by at least a sulfonic acid group, B represents a repeating unit having one of a nitrogen-comprising hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 50.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3, and wherein the porous membrane substrate comprises at least one high molecular material selected from the group consisting of polyethylene, polypropylene, polyimide, polyamidimide, polyvinylidene fluoride and polytetrafluoroethylene.

2. The electrolytic membrane as claimed in claim 1, wherein X, Y and Z in the chemical formula 1 are $0.6 \leq X \leq 0.9$, $0.02 \leq Y \leq 0.3$, $0.03 \leq Z \leq 0.25$, respectively.

3. The electrolytic membrane as claimed in claim 1, which is obtained by a process comprising sulfonating a precursor polymer, wherein the precursor polymer comprises:

the repeating unit A is a repeating unit derived from a vinyl-comprising aromatic compound monomer represented by the following chemical formula 2;

the repeating unit B is a repeating unit derived from a nitrogen-comprising heterocyclic compound monomer having a vinyl group, the nitrogen-comprising heterocyclic compound monomer represented by the following chemical formula 3, and the sulfate, hydrochloride or organic sulfonate thereof; and the repeating unit C is a repeating unit derived from a cross-linking agent comprising a compound having a vinyl group of 2 or more, the compound being represented by the following chemical formula 4:

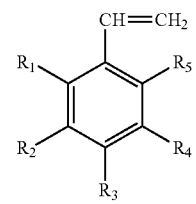

Chemical Formula 2 wherein R1, R2, R3, R4 and R5 each independently represent hydrogen, halogen, one of substituted and unsubstituted, and hydrocarbon group,

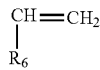

Chemical Formula 3 wherein R6 represents one of substituted and unsubstituted nitrogen-comprising five-membered group, and nitrogen-comprising six-membered group,

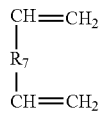

Chemical Formula 4 wherein R7 represents one of substituted organic group having a valence of 2 or more and an unsubstituted organic group.

4. The electrolytic membrane as claimed in claim 3, wherein the vinyl-comprising aromatic compound monomer is at least one member selected from the group consisting of styrene, 4-methylstylene, 4-methylchlorostyrene, 4-methoxystyrene, 1-vinylnaphthalene, 2-vinylnaphthalene, 9-vinylanthracene, 4-vinylbiphenylene, indene and acenaphthylene.

5. The electrolytic membrane as claimed in claim 3, wherein the nitrogen-comprising heterocyclic compound monomer having the vinyl group is at least one member selected from the group consisting of 2-vinylpyridine, 3-vinylpyridine, 4-vinylpyridine, 1-vinylimidazole, 9-vinylcarbazole, 5-vinylpyrimidine, 6-vinylpurine, 4- and 5-vinylquinoline, 4- and 5-vinylisoquinoline, 3-vinylpyrazole, 1-vinylindazole, 2-vinylpyrazine, hydrosulfate, hydrochloride, and hydrosulfate, hydrochloride and organic sulfonate thereof.

6. The electrolytic membrane as described in claim 3, wherein the cross-linking agent comprising the compound having the vinyl group of 2 or more is at least one member selected from the group consisting of divinylbenzene, bisvinylphenylethane, bisphenoxyethane, bisvinylphenoxybutane, bisvinylphenoxyhexane, 4,4'-divinylbiphenylene, divinylsulfone and trivinylbenzen.

7. The electrolytic membrane as claimed in claim 1, wherein the weight of the cross-linked electrolyte in the electrolytic membrane is from 20 to 90% by weight based on the weight of the membrane, and the content of the structural component represented by the chemical formula 1 is 50% by weight or more.

8. The electrolytic membrane as claimed in claim 1, wherein the porous membrane substrate comprises polyethylene.

9. The electrolytic membrane as claimed in claim 1, wherein the porous membrane substrate comprises polypropylene.

10. The electrolytic membrane as claimed in claim 1, wherein the porous membrane substrate comprises polyimide.

11. The electrolytic membrane as claimed in claim 1, wherein the porous membrane substrate comprises polyamidimide.

12. The electrolytic membrane as claimed in claim 1, wherein the porous membrane substrate comprises polyvinylidene fluoride.

13. The electrolytic membrane as claimed in claim 1, wherein the porous membrane substrate comprises polytetrafluoroethylene.

14. A membrane electrode assembly comprising an electrolytic membrane having a fuel electrode joined onto one side thereof and an oxidizer electrode joined onto the other side thereof, the electrolytic membrane being prepared by a process comprising filling a porous membrane substrate with a cross-linked polymer electrolyte having a structure component represented by the following chemical formula 1:

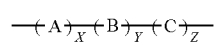

Chemical Formula 1 wherein A represents a repeating unit having an aromatic hydrocarbon group substituted by at least a sulfonic acid group, B represents a repeating unit having one of a nitrogen-comprising hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3.

15. The membrane electrode assembly as claimed in claim 14, wherein the fuel electrode comprises a methanol-oxidizing catalyst.

16. A fuel cell comprising a membrane electrode assembly comprising an electrolytic membrane having a fuel electrode joined onto one side thereof and an oxidizer electrode joined onto the other side thereof, the electrolytic membrane being prepared by filling a porous membrane substrate with a cross-linked polymer electrolyte having at least a structure component represented by the following chemical formula 1:

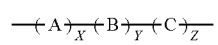

Chemical Formula 1 wherein A represents a repeating unit having an aromatic hydrocarbon group substituted by at least a sulfonic acid group, B represents a repeating unit having one of a nitrogen-comprising hetero ring compound residue, and the sulfate, hydrochloride or organic sulfonate thereof, C represents a repeating unit having a cross-linked group, and X, Y and Z represent mol fractions of respective repeating units in the chemical formula 1, with $0.34 \leq X \leq 0.985$, $0.005 \leq Y \leq 0.49$, $0.01 \leq Z \leq 0.495$ and $Y \leq X$ and $Z \leq X$, provided that, in the repeating unit A, a ratio of the aromatic hydrocarbon group substituted by at least a sulfonic acid group is 0.3 to 1.0, and the number of the sulfonic acid group in the aromatic hydrocarbon group substituted by at least a sulfonic acid group is 1 to 3.

17. A method of operating a fuel cell, which comprises: operating the fuel cell of claim 16 further comprising methanol.

* * * * *